Patented Nov. 28, 1933

1,936,995

UNITED STATES PATENT OFFICE 1,936,995

PRODUCTION OF NITROGENOUS CONDENSATION PRODUCTS FROM ACETYLENE AND AMMONIA

Leo Schlecht and Hans Rötger, Ludwigshafen-on-the-Rhine, Germany, assignors to I. G. Farbenindustrie Aktiengesellschaft, Frankfort-on-the-Main, Germany, a corporation of Germany No Drawing. Application July 28, 1928, Serial No. 296,092, and in Germany August 8, 1927

9 Claims. (Cl. 260—108)

The production of condensation products from acetylene and ammonia with the aid of catalytic substances has been repeatedly described. The catalysts used consisted of the oxids of aluminium, chromiun or iron, and it has also already been proposed to employ for this purpose mixtures of metallic compounds which are reducible by acetylene and are hydrated, or contain, in addition to reducible compounds, hydrated non-reducible additions, such as aluminium hydroxid, or also hydrated silicates alone.

We have now found that considerably better results are obtainable by operating with catalysts consisting of several compounds which are not reducible under the conditions of the reaction, preferably oxids, but not consisting exclusively of hydrated silicates. These catalysts must accordingly not undergo conversion into a lower state of oxidation, or into metal, during the reaction, either by the acetylene or by the hydrogen set free during the condensation and comprise compounds of the metals of from the third to the sixth group of the periodic system and of zinc and manganese.

Preferably the catalysts are employed in a highly porous, active form, or deposited on a carrier which, preferably, exhibits a large and highly active surface. Mixtures of active non-reducible substances, such as active alumina gel and silica gel, are highly effective.

One of the advantages of employing such catalytic substances compared with those hitherto known consists in the higher velocity of conversion. Thus, with a mixture of several metallic oxids, such as zinc oxid and non-reducible oxids of the group 3 or 4 of the periodic system, and employing otherwise equal conditions, an increase in yield is obtained which amounts to double, or more than double, that obtainable with the catalytic substances hitherto used. Moreover, these catalytic substances have almost always a considerably longer working life than those already known, and when spent, can be easily regenerated by heating in damp air.

In general, a slight moisture content of the catalytic substances, or the gaseous mixture, is advantageous, but dry gases may also be employed without any considerable decomposition of the acetylene, such as occurs with the employment of catalysts consisting of reducible metallic oxids, and leads to the choking of the reaction chambers. In the absence of water, a more uniform condensate is obtained than in the presence of water. Moreover, the troublesome separation, which is always attended with losses, of for example the acetonitrile, from the condensed water and the simultaneously formed aldehyde ammonia, is dispensed with.

The temperature employed ranges between 200° and 600° C. but in many cases the best results are obtained at temperatures between 250° and 450° C. With a low reaction temperature, there are obtained, on the average, low-boiling aliphatic substances and higher-boiling aromatic substances in approximately equal proportions. At higher temperatures the low-boiling aliphatic compounds preponderate. The process may be rendered continuous, for example by connecting up in series a plurality of reaction vessels, each of which in turn is regenerated, for example with air, when the catalytic substances are exhausted. The yield of condensation products can be still further increased by the application of pressure, for example by working at a pressure up to about 5 atmospheres.

The resulting condensation products are particularly suitable for use as denaturing agents for alcohols (such as ethyl alcohol) and the like. The condensation products, which according to the temperature at which they are produced, consist chiefly of methylated pyridines (such as picoline, lutidine and collidine) in addition to more or less acetonitrile and pyridine, have a repellent smell and taste, and dissolve readily in alcohol, without turbidity occurring when such solution is diluted with water. Moreover it is impossible to purify alcohol, denatured with these agents, in any easy manner, such as by filtration through active charcoal, or by distillation, or to mask the objectionable smell and taste completely by other strong-smelling or tasting substances.

In some cases, according to the purpose for which the denatured liquid is intended, it is advisable to employ only a certain fraction of the condensation product, such as that passing over between 100° and 150° C. or to add other substances to the denaturing agent.

The following examples will further illustrate the nature of the invention which however is not restricted thereto.

*Example 1*

A mixture of finely divided thorium oxid and zirconium oxid is made into a suspension with water, the paste being dried, broken into small pieces and charged into a tubular reaction vessel. On passing a mixture of equal parts of acetylene and ammonia therethrough at about 350° C., a homogeneous, yellow-brown liquid is obtained, of the density 0.87 and containing about equal amounts of acetonitrile and pyridine bases, the yield being substantially better than with, for example, partially reduced ferruginous bauxite. Distillation of the condensate in vacuo leaves only 4 per cent of tarry residue.

Example 2

Active silica is impregnated with an aqueous solution of zinc nitrate and thorium nitrate. After drying the gel, the absorbed salts are calcined at 500° C. in a current of air. A mixture of 4 parts of acetylene and 3 parts of ammonia is passed at 450° C. through a series of interconnected tubes filled with this catalyst. The acetylene is completely transformed into liquid condensation products, about 75 per cent of which consist of acetonitrile. The yield per unit of the volume of the catalyst and per hour is substantially higher than with bauxite under the same conditions.

Example 3

To a mixture consisting of 83 per cent of hydrogen, 3.5 per cent of methane, 3.5 per cent of nitrogen and 10 per cent of acetylene, as can be obtained by passing coke oven gas through a high tension electric arc, an amount of ammonia equivalent to that of acetylene is added whereupon the mixture is passed at 350° C. over a catalyst consisting of silica gel loaded with zinc oxid and thoria at a speed of 100 liters per hour and per each liter of the catalyst employed. The acetylene is completely converted into liquid condensation products consisting mainly of acetonitrile and picolines. The remaining gases containing 85 per cent of hydrogen, 8.7 per cent of nitrogen, 2.5 per cent of methane and 2.5 per cent of ammonia can be further employed, if necessary after a purification, as an initial material for other catalytic processes such as the synthesis of ammonia.

Working with rather diluted acetylene, such as the industrial mixture mentioned above offers the special advantages on the one hand of avoiding costly enriching operations and on the other hand of producing much slower degradation of the activity of the catalyst than in the case of concentrated mixtures of acetylene and ammonia, overheating by the decomposition of acetylene to carbon being avoided. The composition of the mixture of gases can be varied in wide limits without a considerable alteration of the nature of the condensation products.

Example 4

A pure 96 per cent solution of alcohol is denatured with 1 per cent of the crude condensate obtained by the catalytic condensation of acetylene with ammonia at 350° C. The denatured alcohol burns with a non-smoky flame. On being diluted with water down to an alcohol content of 40 per cent, no turbidity occurs. The bitter taste and characteristic smell persist after the dilution, and also after distillation, and after filtration through adsorption charcoal.

What we claim is:

1. In the production of condensation products from acetylene and ammonia by passing a mixture containing the said gases at a temperature between 200 and 600° C. over a catalytic substance, the step which comprises passing the said gaseous mixture over a catalyst comprising several oxidic metal compounds which are not reduced to the corresponding metal by the reaction gases at the temperature employed.

2. In the production of condensation products from acetylene and ammonia by passing a mixture containing the said gases at a temperature between 200 and 600° C. over a catalytic substance, the step which comprises passing the said gaseous mixture over a catalyst comprising several oxidic highly porous metal compounds which are not reduced to the corresponding metal by the reaction gases at the temperature employed.

3. In the production of condensation products from acetylene and ammonia by passing a mixture containing the safe gases at a temperature between 200 and 600° C. over a catalytic substance, the step which comprises passing the said gaseous mixture over a catalyst comprising several oxidic metal compounds which are not reduced to the corresponding metal by the reaction gases at the temperature employed and a carrier of gel structure selected from the group consisting of hydrated alumina and silica gel.

4. In the production of condensation products from acetylene and ammonia by passing a mixture containing the said gases at a temperature between 200 and 600° C. over a catalytic substance, the step which comprises passing the said gaseous mixture over a catalyst comprising several metal oxids which are not reduced to the corresponding metal by the reaction gases at the temperature employed.

5. In the production of condensation products from acetylene and ammonia by passing a mixture containing the said gases at a temperature between 200 and 600° C. over a catalytic substance, the step which comprises passing the said gaseous mixture over a catalyst comprising several metal oxids which are not reduced to the corresponding metal by the reaction gases at the temperature employed and a carrier of gel structure selected from the group consisting of hydrated alumina and silica gel.

6. In the production of condensation products from acetylene and ammonia by passing a mixture containing the said gases at a temperature between 200 and 600° C. over a catalytic substance, the step which comprises passing the said gaseous mixture over a catalyst comprising several oxidic metal compounds which are not reduced to the corresponding metal by the reaction gases at the temperature employed and a highly active carrier of gel structure comprising hydrated alumina.

7. In the production of condensation products from acetylene and ammonia by passing a mixture containing the said gases at a temperature between 250 and 450° C. over a catalytic substance, the step which comprises passing the said gaseous mixture over a catalyst comprising zinc oxid and thoria.

8. In the production of condensation products from acetylene and ammonia by passing a mixture containing the said gases at a temperature between 250 and 450° C. over a catalytic substance, the step which comprises passing said gaseous mixture over a catalyst comprising zinc oxide, thoria and a carrier of gel structure selected from the group consisting of hydrated alumina and silica gel.

9. In the production of condensation products from acetylene and ammonia by passing a mixture containing the said gases at a temperature between 250 and 450° C. over a catalytic substance, the step which comprises passing the said gaseous mixture over a catalyst comprising zinc oxid, thoria and silica gel.

LEO SCHLECHT.
HANS RÖTGER.